(12) United States Patent
Lin et al.

(10) Patent No.: US 7,876,361 B2
(45) Date of Patent: Jan. 25, 2011

(54) SIZE CALIBRATION AND MAPPING IN OVERHEAD CAMERA VIEW

(75) Inventors: Yun-Ting Lin, White Plains, NY (US); Tomas Brodsky, Croton on Hudson, NY (US); Mi-Suen Lee, New York, NY (US)

(73) Assignee: Honeywell International Inc., Morristown, NJ (US)

( * ) Notice: Subject to any disclaimer, the term of this patent is extended or adjusted under 35 U.S.C. 154(b) by 1416 days.

(21) Appl. No.: 11/329,461

(22) Filed: Jan. 11, 2006

(65) Prior Publication Data
US 2007/0024704 A1   Feb. 1, 2007

Related U.S. Application Data

(60) Provisional application No. 60/702,548, filed on Jul. 26, 2005.

(51) Int. Cl.
*H04N 5/228* (2006.01)
(52) U.S. Cl. .................. 348/222.1; 348/143; 348/169; 348/416.1
(58) Field of Classification Search .............. 348/222.1, 348/143, 169, 416.1; 382/103, 107, 190, 382/224, 294
See application file for complete search history.

(56) References Cited

U.S. PATENT DOCUMENTS

| 6,414,314 B1 * | 7/2002 | Ikeda .......................... 250/353 |
| 6,687,386 B1 * | 2/2004 | Ito et al. ..................... 382/103 |
| 6,697,104 B1 | 2/2004 | Yakobi |
| 2004/0179736 A1 | 9/2004 | Yin |

* cited by examiner

*Primary Examiner*—Yogesh K Aggarwal
(74) *Attorney, Agent, or Firm*—Husch Blackwell Welsh Katz

(57) ABSTRACT

To calibrate images from an overhead camera, two equal-length reference lines at different heights relative to the floor plane are imaged. By comparing the resultant image-width of each of these lines in the view provided by the camera, the effective focal point of the camera is determined. In a preferred embodiment, a doorframe is used to provide equal-length lines at different heights parallel to the floor. The threshold of the doorway at the floor plane is used as a reference plane, and a parallel calibration line at a known/measured height in the doorway is defined. The image produced by a vertically oriented camera of these two equal length lines will show a longer line at the elevated position, the different widths of the images of these lines being dependent upon the camera's effective focal point. From these two projections of the equal-length lines at different heights, the camera's focal point distance from the reference floor plane is determined.

22 Claims, 2 Drawing Sheets

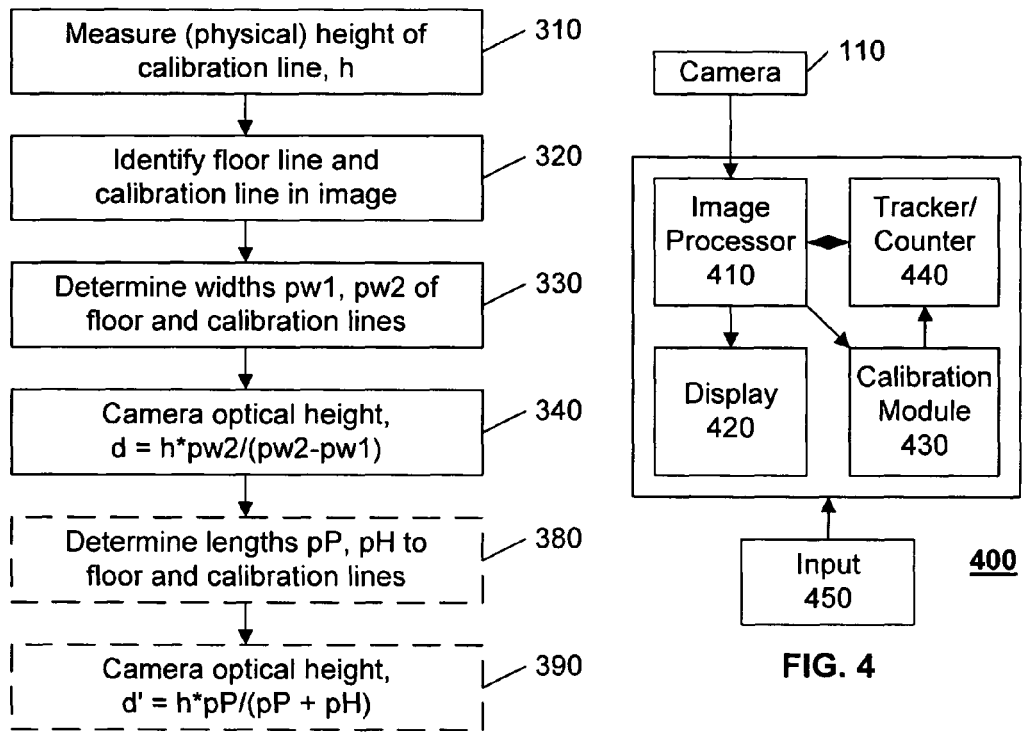
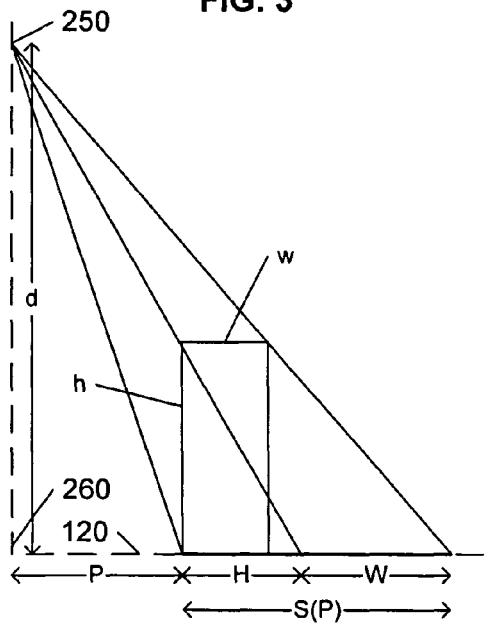
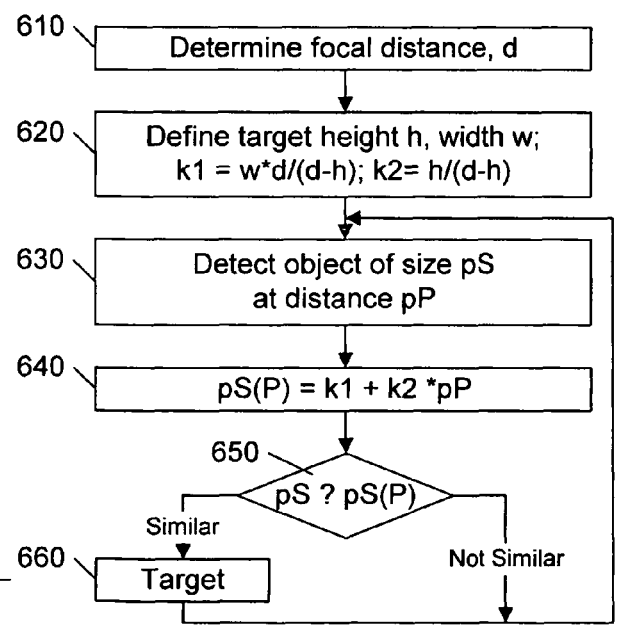
FIG. 3
FIG. 4
FIG. 5
FIG. 6

SIZE CALIBRATION AND MAPPING IN OVERHEAD CAMERA VIEW

This application claims the benefit of U.S. Provisional Patent Application 60/702,548, filed 26 Jul. 2005.

BACKGROUND AND SUMMARY OF THE INVENTION

This invention relates to the field of surveillance systems, and in particular to a video content analysis system that includes cameras situated to provide a downward-looking view, such as cameras used for counting persons entering and/or leaving facilities.

Video surveillance systems are commonly used to monitor access to facilities. In some applications, video cameras are deployed to count the number of people entering and leaving an area. In such applications, the camera is often mounted in a ceiling adjacent a doorway through which people must pass to enter or leave the area, and oriented with a vertical field of view. A video processing system analyzes the images from this downward-viewing camera to distinguish and count individuals.

To provide an accurate count, the individuals need to be tracked as they pass beneath the camera, to determine whether they are entering or leaving, and to detect 'false counts', wherein individuals pass beneath the camera in one direction, then back up or turn around, and do not complete the transit through the doorway. Because the camera is oriented vertically, however, and because the distance between the camera an the individual's head is relatively small, the image of the individual substantially changes as the individual enters the camera's field of view, passes beneath the camera, then exits the camera's field of view.

Because of the substantial changes in the image shape and size as an individual approaches and passes beneath an overhead camera, and the need to track each individual to maintain an accurate count, most image processing systems designed for such counting require a dynamic scaling of objects in an image, based on the camera's angle of view to the object.

FIG. 1 illustrates an example configuration of an overhead camera 110 mounted a distance d above a floor plane 120, with a field of view that is substantially orthogonal to the floor plane. Two positions 150, 150' of a person are illustrated. At position 150, the person is in line with the centerline of the camera's field of view, and using the floor surface 120 as a reference plane, will appear in the camera image as wide as an object of width W on the floor. At position 150', the person is offset by an amount p from the centerline of the camera, and will appear in the camera image as wide as an object of width W' on the floor. On the camera image plane, which is parallel to the floor reference plane, the ratio of pixel line lengths corresponding to the images of the person at locations 150, 150' will be equal to the ratio of widths W'/W.

The increase in width W' as a function of the distance p from the camera centerline is dependent primarily on two factors: the height, h, of the person, and the "optical" height, d, of the camera. The term "optical height" takes into account the optical characteristics of the camera and its lens. That is, in the example of FIG. 1, the illustrated field-of-view lines that define the projection of the person on the floor are shown as converging to a point 101. In reality, the point at which these lines effectively converge, the effective focal point, is determined by the camera's optical characteristics.

It is an object of this invention to provide a method and system for determining the effective optical height of a camera. It is a further object of this invention to provide a method and system for determining a scaling function for use in a tracking system that uses a vertically oriented camera.

These objects, and others, are provided by a calibration method and system that facilitates determination of an effective focal point of a vertically oriented camera. Two equal-length reference lines at different heights relative to a reference plane are imaged. By comparing the resultant image-width of each of these lines in the view provided by the camera, the effective focal point of the camera is determined. In a preferred embodiment, a doorframe is used to provide equal-length lines at different heights parallel to a floor plane. The threshold of the doorway at the floor plane is used as a reference line, and a parallel calibration line at a known/measured height in the doorway is defined. The image produced by a vertically oriented camera of these two equal-length lines will show a longer line at the elevated position, the different widths of the images of these lines being dependent upon the camera's effective focal point. From these two projections of the equal-length lines at different heights, the camera's focal point distance from the reference floor plane is determined.

BRIEF DESCRIPTION OF THE DRAWINGS

The invention is explained in further detail, and by way of example, with reference to the accompanying drawings wherein:

FIG. 3 illustrates an example flow diagram of a process for determining the optical height of a vertically oriented camera.

FIG. 4 illustrates an example surveillance system for counting individuals using a ceiling mounted camera system.

FIG. 5 illustrates an example target model that is used to provide parameters for distinguishing target objects.

FIG. 6 illustrates an example flow diagram for identifying target objects based on the target model of FIG. 5.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The invention discloses an effective method to approximate object's size measurement in their depth range using readily available information taken directly from the scene.

This also makes the configuration of setup of the system less dependent on the skill levels of the system installer or the availability of a 'sample target'.

Figure 1:
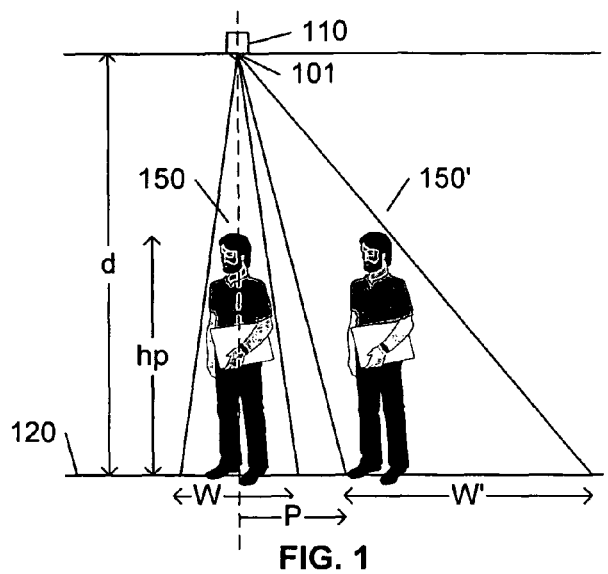
FIG. 1 illustrates an example configuration of a ceiling mounted camera, and the projection of object images based on the location of the objects relative to a centerline of the camera.
Figure 2A:
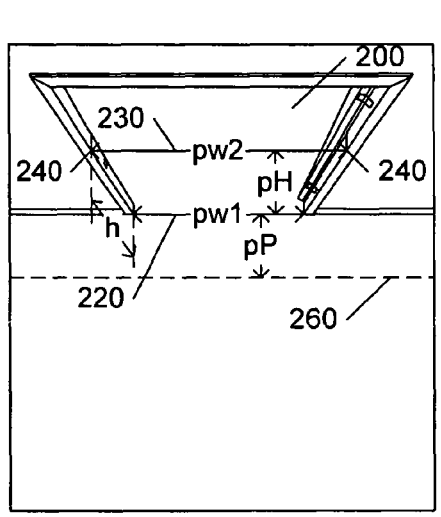
FIG. 2A illustrates an example view of a doorway from a ceiling mounted camera.
Figure 2B:
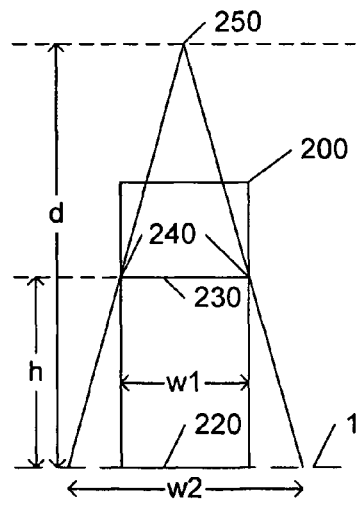
FIG. 2B illustrates a frontal view of the doorway.

FIG. 2A illustrates an example view of a doorway from a ceiling mounted camera, and FIG. 2B illustrates a frontal view of the doorway. The invention is presented herein using the paradigm of a doorway being within view of a ceiling mounted camera that looks directly downward (i.e. overhead camera), because ceiling mounted cameras are commonly used to track and count the number of people passing through a doorway and the overhead camera view has the least amount of occlusion between adjacent people. However, as discussed further below, alternative arrangements can be used.

The invention is premised on the observation that the view of equal length lines on two planes separated by a known distance can be used to determine the focal point of the optical system that provides the view, particularly if the planes are perpendicular to the view of the camera. In a typical system, because of the prominent barrel distortion in the optical sensor, the image geometry does not conform to the linear model in the pin-hole camera, and the actual focal length must be determined in order to recover the full geometry in the camera view. Depending upon the particular deployment and the particular type of lens system, such as whether a vari-focal lens is used, it is often difficult or impossible to determine the focal length accurately.

The invention is further premised on the observation that the doorway that is commonly within a ceiling camera's field of view provides a convenient source of equal length lines on two planes, as illustrated in FIGS. 2A and 2B. Assuming that the doorway 200 is a proper rectangle, the span w1 of the doorway at the floor plane 120 is the same as the span w1 of the doorway at any plane that is parallel to the floor.

In accordance with one aspect of this invention, a user defines a calibration line 230 at a known height h in the doorway, either by identifying the top of the doorway, or, if the top of the doorway is not visible, placing temporary marks 240 on the doorframe or extending a bar or rod (not illustrated) across the doorway. When viewed in the camera image of FIG. 2A, the appearance of this calibration line 230 at height h will have an image-width of pw2, whereas a reference line 220 at the floor plane 120 will be displayed with an image-width of pw1. For convenience, these widths pw1, pw2 are generally measured in units of pixels.

As illustrated in FIG. 2B, the optical focal point 250 determines the width of the projection of the line 230 on the floor plane 120. Using simple geometry, the following relationships can be shown:

$$\frac{w2}{w1} = \frac{pw2}{pw1} = \frac{d}{(d-h)}; \qquad (1)$$

where d is the distance from the floor plane 120 to the optical focal point 250. Therefore, solving for d, it can be shown:

$$d = h * \frac{pw2}{(pw2 - pw1)}. \qquad (2)$$

Thus, by measuring the image-widths pw1, pw2 of the appearance of two equal-length parallel lines 220, 230 that are separated by a known height, h, the focal-distance, d of the optical focal point 250 of the camera producing the image from the reference floor plane can be determined. Although a doorway is used to facilitate the creation of the two equal-length parallel lines, one of ordinary skill in the art will recognize that alternative jigs or fixtures, such as a rectangular panel, can be used to provide a reference line on the floor plane and a calibration line at a known height. In like manner, although a line on the floor plane is used as a reference line, one of ordinary skill in the art will recognize that any other parallel line to the line 230 could be used, provided that the height of this other line above the floor plane is also known, and provided that the above geometric relationships are suitably modified. Similarly, with appropriate modification of the geometric relationships, unequal-length parallel lines could be used, provided that the relationship between the lengths is known.

Figure 2C:
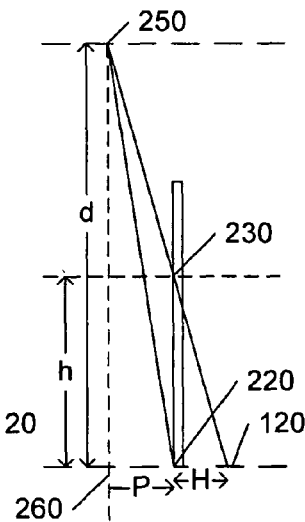
FIG. 2C illustrates a profile view of the doorway.

As illustrated in FIG. 2C, the distance d of the focal point 250 above the floor can also be determined by the projection H (pH in FIG. 2A) of the height h of the calibration line 230 above the reference line 220, relative to the distance P (pP in FIG. 2A) to the reference line 220. However, in a typical configuration, the projection pH of the height h is often substantially smaller than the projection pw1 of the width w1 of the doorway, because the camera is usually configured to provide a complete view of the width of the opening, with minimal 'wasted space' to the left and right of the doorway. As such, a calibration based on the projections of lengths pH and pP will not generally be as precise as one based on the larger projections pw1, pw2.

Given a horizontal distance P from the centerline 260 of the camera to the doorway, and a reference line 230 at a given height h, the following relationship exists:

$$\frac{h}{d} = \frac{H}{P+H} = \frac{pH}{pP+pH}, \qquad (3)$$

where H is the distance on the floor plane between the line 220 at the doorframe and a projection of the line 230 from the location of the optical focal point 250 of the camera. The terms pH and pP are the corresponding lengths of these distances P and H in the camera image, as illustrated in FIG. 2A, and are commonly measured in units of pixels. Based on this relationship, the height d of the optical focal point 250 of the camera can be determined as:

$$d = h * \frac{pP}{(pP + pH)}. \qquad (4)$$

Ideally, the determined distance d in equation (4) will be the same distance d determined in equation (2). However, as noted above, and as can be seen in FIG. 2A, the measures pP and pH upon which the determination of d is based in equation (4) are substantially smaller lengths than pw2 and pw1, and thus will not generally provide as precise a determination of d as in equation (2), which is based on pw2 and pw1. However, because these determinations are estimates of the actual height of the focal point, one of ordinary skill in the art will recognize that the two determinations of d from equations (2) and (4) could be combined, using a weighted average, the weights being based on the confidence associated with the accuracy of each determination. Optionally, the difference between the two determinations can be used as an error-check, such that if the difference is above a given threshold, the user is warned and encouraged to check the measurements.

FIG. 3 illustrates a flow diagram for determining the distance of the optical focal point of a vertically mounted camera above a floor plane, based on the identification of two parallel lines, as might be embodied, for example, in a calibration module 430 of a tracking and counting system 400 as illustrated in FIG. 4.

At 310, the height, h, of an identified calibration line above the floor plane is measured. As noted above, the preferred calibration line is a line that is parallel to a corresponding equal-length line on the floor plane, such as an existing or created line across a doorway at a given height.

At 320, a user identifies the two reference lines in the image from the camera, typically by 'pointing to and clicking on' each end of each line in response to a query from the system. Based on this identification of each line, the system determines, at 330, the span of each line pw1, pw2, typically measured as the number of pixels between the identified ends of each line.

At 340, the elevation d of the optical focal point above the floor plane is determined, based on equation (2), above. In an example embodiment of a tracking and counting system, this determined distance d is used to apply an appropriate scaling factor to objects in an image, based on the object's distance from the centerline of the camera, as discussed further below with regard to FIGS. 5 and 6.

Optionally, at 380 and 390, a second determination of the elevation d of the optical focal point is performed, based on the image-distance pP from the center of the image to the first reference line, and the image-distance pH between the two reference lines, as discussed above with regard to FIG. 2C and equation (4). Not illustrated, this second determination can be combined with the determination at block 340, and/or used to identify potential problems in the determination, such as mistakes in identifying the reference lines in the image at block 320, based on the difference between these two determinations, as also discussed above.

FIG. 4 illustrates an example tracking and counting system 400. The system 400 includes an image processor 410 that processes images from a camera 110, which is vertically oriented to facilitate counting objects that pass beneath it. The image processor 410 works in conjunction with a tracker/counter 440 that is configured to determine the path of target objects and to count the number of target objects that transit the camera's field of view in each direction. A display 420 and input 450 is provided to facilitate interactions with a user of the system. To facilitate the proper interpretation of images received, the system 400 includes a calibration module 430 that embodies the above described method of determining the optical height of a camera as part of its calibration process, typically upon installation.

Rapid and efficient discrimination between objects to be counted and other objects (between 'targets' and 'non-targets') can have a substantial effect on the efficiency and effectiveness of a tracking and counting system. For example, most tracking systems have different levels of detail for comparison, and avoiding the complex comparisons of image data until an image object is identified as a target can save significant amounts of processing time.

In a typical tracking and counting system, the objects to be counted have characteristics that distinguish these target objects from other non-target objects that may appear in a camera image. For example, in a person-counting application, a size characteristic may distinguish a person from a pet, a person from a package, an adult from a child, and so on. As noted above, however, the image-size of an object changes substantially as the object travels beneath a vertically oriented camera. Such size change also depends on the height of the object. For example, the image of a child at a distance from the centerline of a vertically oriented camera may be larger than an image of an adult who is relatively close to the centerline. A small dog that travels through the door may have very little size change regardless of its location in the image, since it travels close to the floor surface given its limited height.

FIG. 5 illustrates an example target model for use in a tracking and counting system, such as illustrated in FIG. 4, and FIG. 6 illustrates an example flow diagram for distinguishing target objects based on the target model.

The target model of FIG. 5 is a rectangle having a given height and width; optionally, other target model shapes may be used, such as an ellipse having a given major and minor axes. In an alternative embodiment, the model could include a depth parameter, but height and width are sufficient to explain the principles involved in this aspect of this invention. When viewed from a camera having an effective focal point 250 at a height d above the floor plane 120, the height h and width w of the model at a distance P from the centerline 260 of the camera will exhibit a projection of length H+W relative to the floor plane 120. Without relying on being able to distinguish between the projection caused by the model's height h and the projection caused by the model's width w, the model at a distance P from the centerline will exhibit a projected size of S(P) relative to the floor plane 120, and this size can be determined as:

$$S(P) = W + H = w*d/(d-h) + P*h/(d-h). \quad (5)$$

As can be seen, at a distance of P=0, the projected size S(P) is dependent on the width w of the model, scaled by the relative distance (d−h) between the camera and the top of the rectangle. Given a defined model, this size is a constant. The rate of increase in size of the projection with distance P from the camera centerline is dependent upon the height of the model relative to the distance (d−h) between the camera and the top of the rectangle, which is also a constant. Note also that the added projection H does not affect the size of the projection until both edges of the model extend beyond the centerline of the camera, and thus the distance P is properly measured as the distance between the camera centerline and the nearest edge of the model when the entire model is beyond the centerline of the camera.

Using the previous convention of a prefix "p" to represent projections on the image frame, typically in units of pixels, and terms k1 and k2 representing the aforementioned constants, equation (5) can be recast as:

$$pS(P) = k1 + k2*pP, \quad (6)$$

where pS(P) is the image-length of the appearance of the model provided by the camera when the model is at a distance of P from the centerline of the camera; pP is the image-distance between the center of the image and the appearance of the model in the image; k1 is $w*d/(d-h)$; and k2 is $h/(d-h)$. That is, pS(P) is the image-length of an object in a camera view measured in a radial direction from the center of the camera view, and pP is the image-distance of the object in the camera view from the center of the camera view, measured in the same radial direction. In an example of a person, pS(P) is the distance of the person's feet to the center of the camera view.

Using this model, the image-size of each object that appears anywhere in an image from a camera can be compared to the expected image-size of the model at an identified distance P from the camera centerline, to determine whether the observed object might be a potential target, regardless of its distance from the overhead camera. This model can also be used to model the size decrease as the object moves further away from the center of the image and becomes only partially seen in the camera view.

Referring to the flow diagram of FIG. 6, the determination of the optical height, d, of the camera is determined, at 610, using the techniques described above, such as illustrated in the flow diagram of FIG. 3. At 620, the target model height h and width w are defined, and the constants k1 and k2 for this model are determined, based on the relationships defined in equation (5), above. Thereafter, the process enters a continuous loop to process the images received from the camera.

At 630, an 'object', i.e. a collection of image pixels that appear to be traveling in the same direction, is detected in the camera image, and the distance pP between the edge of the object and the center of the image is determined. Generally, an object appears at an edge of the camera image and gradually moves toward the center of the image, decreasing the distance pP while increasing its size pS as more of the object is included in the image. The process 630-660 is designed to be repeated, to determine whether the size pS of an object in the image approximates the size pS(P) of an image of the target model at the same distance pP from the center of the image. When an object is detected at 630, the process advances to block 640.

At 640, the size pS(P) of an image of the target model at the distance pP from the center of the image is determined, using equation (6) defined above, and at 650, the size of the object pS is compared to this target model size pS(P), to determine whether the object exhibits a similar size characteristic. If, at 650, the sizes are determined to be substantially different, the object is not classified as a target, and the process is repeated, at 630.

If, at 650, the sizes are determined to be similar, the object is classified as a target, at 660. In a preferred embodiment, this classification causes other processes in the tracker/counter 440 of FIG. 4 to be enabled, to thereafter track this target object and adjust the count when and if this target object transits the camera's field of view. This process continues, at 630.

Depending upon the particular application, the process may be configured to continually assess all detected objects, or only the detected objects that have not yet been 'finally' classified as either targets or non-targets. A continual assessment is preferred in applications where targeted objects may subsequently be reclassified based on its changing size, as contrast to applications wherein once an object is classified, it retains that classification regardless of any subsequent changes in size. That is, for example, as an object enters a camera's field of view, its image-size grows as more of the object is contained in the view, and thus the processing of this object is at least continual until the target-size is reached and it is declared to be a target, or, until the entirety of the object is within the camera's field of view and determined to be below the target-size threshold, and declared to be a non-target. As the object continues toward the center of the image, its size will change, depending upon its height. If the application is configured to assure that both the height and width criteria are satisfied, the assessment may continue for targeted objects, to re-classify the object as a non-target if it is determined that the size of the object does not diminish as a target of the appropriate height and width would diminish in size as it approached the center of the image.

At 650, the criteria used for determining similarity is dependent upon the particular application, and upon the degree of variance allowed among target objects. In most applications, the parameters h, w, used to define the model are configured to define a minimum size requirement, and any size above the minimum is considered to meet the similarity requirement. In other applications, a set of parameters h, w may be used to define minimum and maximum sizes for an object to be defined as a target. In such an application, the detection at 630 is continuous, and the marking of the object as a target is rescinded if the object exceeds the maximum size criteria.

Also at 650, the criteria used for determining similarity can also be used to determine if multiple targets have formed a group and should be counted as a multiple-person object. For example, different size thresholds may be used to identify the number of target objects comprising the detected object in the image.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although this invention is particularly well suited for a vertically oriented camera used to count target objects transiting the camera's view, the principles presented herein may be applicable to other applications as well. For example, all cameras, regardless of their orientation, will exhibit similar changes in the relative size of images of objects as the objects pass in front of the camera, depending upon their shapes and distances from the effective focal point of the camera. Similarly, although the reference and calibration lines in the illustrated examples lie in a plane that is perpendicular to reference (floor) plane, to simplify the mathematics involved, one of ordinary skill in the art will recognize that different geometric relationships may alternatively or additionally be used. For example, lines or shapes formed by tiles on the floor plane can be used to determine the focal-distance by developing geometric relationships between the size of the lines on the floor and the size of the lines as they appear in the camera image. In like manner, although this invention is described for use in a target/non-target classification based on the apparent size of an object, the principles of this invention may also be applied to a multiple-size classification system, such as an inventory control system that counts the number of objects of different sizes that are removed from an area, or a system that determines an object's dimensions based on its changing appearance as it passes in front of a camera. These and other system configuration and optimization features will be evident to one of ordinary skill in the art in view of this disclosure, and are included within the scope of the following claims.

In interpreting these claims, it should be understood that:
 a) the word "comprising" does not exclude the presence of other elements or acts than those listed in a given claim;
 b) the word "a" or "an" preceding an element does not exclude the presence of a plurality of such elements;
 c) any reference signs in the claims do not limit their scope;
 d) several "means" may be represented by the same item or hardware or software implemented structure or function;
 e) each of the disclosed elements may be comprised of hardware portions (e.g., including discrete and integrated electronic circuitry), software portions (e.g., computer programming), and any combination thereof;
 f) hardware portions may be comprised of one or both of analog and digital portions;
 g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

We claim:

1. A method comprising:

identifying a first line and a second line, substantially parallel to the first line, in a scene within a field of view of a camera;

determining a distance between the first line and the second line, determining a first image-width of the first line, as the first line appears in an image of the scene, determining a second image-width of the second line, as the second line appears in the image of the scene, and determining a focal-distance of the camera from a plane that includes the first line and is substantially perpendicular to a center-line of view of the camera, based on the distance between the first line and the second line, and the first and second image-widths, wherein the first and second lines have substantially equal widths, and the focal-distance, d, is determined using:

$$d=h*pw2/(pw2-pw1),$$

where: h is the distance between the first and second lines, pw1 is the image-width of the first line, and pw2 is the image-width of the second line.

2. The method of claim 1, wherein the plane corresponds to a floor plane.

3. The method of claim 2, wherein the camera is mounted in a ceiling.

4. The method of claim 2, wherein the scene includes a doorway, and the first and second lines extend across the doorway.

5. The method of claim 1, including determining an image-size of an object in the image, based on the focal-distance and an image-distance of the object from a center of the image.

6. The method of claim 1, including determining an image-size of an object in the image, based on the focal-distance and an image-distance of the object from a center of the image.

7. The method of claim 6, wherein the image-size of the object is further based on a height and a width of the object.

8. The method of claim 7, wherein the image-size, S, is determined using:

$$S=w*d/(d-h)+P*h/(d-h)$$

where: w is the width of the object, h is the height of the object, d is the focal-distance, and P is the image-distance of the object from the center of the image.

9. The method of claim 1, including:

detecting an object in the image having an image-size at an image-distance from a center of the image, determining whether the object corresponds to a target object, based on a target size and the image-size.

10. The method of claim 9, including determining the target size is based on a height and a width of a target model, the image-distance, and the focal-distance.

11. The method of claim 10, wherein the target size, S, is determined using:

$$S=w*d/(d-h)+P*h/(d-h)$$

where: w is the width of the target model, h is the height of the target model, d is the focal-distance, and P is the image-distance of the object from the center of the image.

12. The method of claim 6, including determining a number of targets within the object in the image, based on the image-size of the object.

13. The method of claim 12, wherein determining the number of targets includes comparing the image-size to a plurality of size thresholds.

14. A method comprising:

obtaining an image from a camera having a line of view that is substantially perpendicular to a floor plane, at an optical-distance from the floor plane, detecting an object in the image having an image-size at an image-distance from a center of the image, and determining whether the object corresponds to one or more target objects, based on the image-size, image-distance, the optical-distance, and a height and width of a target model, wherein the target size, S, is determined using:

$$S=w*d/(d-h)+P*h/(d-h)$$

where: w is the width of the target model, h is the height of the target model, d is the optical-distance, and P is the image-distance of the object from the center of the image.

15. The method of claim 14, including determining a number of targets within the target-object, based on a comparison of the image-size to a plurality of size thresholds.

16. A system comprising:

an image processor that is configured to receive an image from a camera having a field of view that includes a reference plane and a focal-distance from the reference plane, a display that is configured to display the image, a calibration module that is configured to facilitate a determination of the focal-distance based on items in the image, and a tracker that is configured to identify an object in the image as a target object based on an image-size of the object at an image-distance from a center of the image, wherein the calibration module is configured to determine the focal-distance based on:

a distance between the first line and the second line, an image-width of a first line on the reference plane, as the first line appears in the image, and an image-width of a second line that is substantially parallel to the first line, as the second line appears in the image, and wherein the first and second lines are of equal width, and the calibration module determines the focal-distance, d, as:

$$d=h*pw2/(pw2-pw1),$$

where: h is the distance between the first and second lines, pw1 is the image-width of the first line, and pw2 is the image-width of the second line.

17. The system of claim 16, wherein the image includes a doorway, and the first and second lines span the doorway.

18. The system of claim 17, wherein the reference plane substantially corresponds to a floor plane, and the camera is mounted in a ceiling above the floor plane.

19. The system of claim 18, wherein
the calibration module determines the focal-distance, d, as:

$$d = h*pw2/(pw2-pw1),$$

where: h is the distance between the first and second lines, pw1 is the image-width of the first line, and pw2 is the image-width of the second line.

20. The system of claim 19, including the camera.

21. The system of claim 16, wherein
the tracker is further configured to determine a number of targets within the target object, based on the image-size.

22. The system of claim 21, wherein
the tracker is configured to determine the number of targets by comparing the image-size to a plurality of size thresholds.

* * * * *